United States Patent
Effenberger et al.

(10) Patent No.: US 8,542,993 B2
(45) Date of Patent: Sep. 24, 2013

(54) BURST POWER MEASUREMENTS USING AVERAGED POWER MEASUREMENT

(75) Inventors: Frank J. Effenberger, Bridgewater, NJ (US); Yin Jinrong, Shenzhen (CN); Yang Sulin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/460,185

(22) Filed: Apr. 30, 2012

(65) Prior Publication Data
US 2012/0230684 A1  Sep. 13, 2012

Related U.S. Application Data

(63) Continuation of application No. 12/276,578, filed on Nov. 24, 2008, now Pat. No. 8,200,083.

(60) Provisional application No. 61/018,800, filed on Jan. 3, 2008.

(51) Int. Cl.
*H04B 10/08* (2011.01)
*H04B 10/20* (2011.01)
*H04J 14/00* (2006.01)

(52) U.S. Cl.
USPC ............... 398/38; 398/37; 398/58; 398/67

(58) Field of Classification Search
USPC ................... 398/37–38, 58, 66–67
See application file for complete search history.

(56) References Cited

U.S. PATENT DOCUMENTS

| | | | |
|---|---|---|---|
| 2004/0241320 A1 | 12/2004 | Minami et al. | |
| 2004/0247320 A1 | 12/2004 | Bickham et al. | |
| 2006/0127100 A1* | 6/2006 | Frankel et al. | 398/158 |
| 2007/0023615 A1 | 2/2007 | Ruegg et al. | |
| 2007/0036483 A1 | 2/2007 | Shin et al. | |
| 2007/0201867 A1 | 8/2007 | DeLew et al. | |
| 2007/0230958 A1 | 10/2007 | Jiang et al. | |
| 2008/0056720 A1 | 3/2008 | Sitton et al. | |
| 2008/0137179 A1 | 6/2008 | Li et al. | |

FOREIGN PATENT DOCUMENTS

| | | |
|---|---|---|
| CN | 1889398 A | 1/2007 |
| CN | 101013919 A | 8/2007 |
| CN | 101047442 A | 10/2007 |
| JP | 2001358738 A | 12/2001 |

OTHER PUBLICATIONS

Foreign Communication from a counterpart application, European Application 08870135.4, European Search Report dated Jul. 11, 2011, 6 pages.

(Continued)

*Primary Examiner* — Dawayne A Pinkney
(74) *Attorney, Agent, or Firm* — Conley Rose, P.C.; Grant Rodolph; Jonathan K. Polk

(57) ABSTRACT

An apparatus comprising an individual optical power level calculation (IOPLC) module and a transceiver coupled to the IOPLC module and configured to communicate with a plurality of optical network units (ONUs). Also disclosed is an apparatus comprising a control and management (CM) module, an average power level measurement (APLM) module coupled to the CM module, a first transceiver coupled to the CM module and configured to communicate with an optical line terminal (OLT), and a second transceiver coupled to the CM module and the APLM module, and configured to communicate with a plurality of ONUs.

20 Claims, 6 Drawing Sheets

(56) References Cited

OTHER PUBLICATIONS

Foreign Communication from a counterpart application, PCT Application PCT/CN2008/073896, International Search Report and Written Opinion dated Mar. 16, 2009, 10 pages.
Communication from a counterpart application, U.S. Appl. No. 12/276,578, Office Action dated Sep. 14, 2011, 18 pages.
Communication from a counterpart application, U.S. Appl. No. 12/276,578, Notice of Allowance dated Feb. 24, 2012, 8 pages.
Foreign Communication From a Related Counterpart Application, Chinese Application No. 200880119052.3, Chinese Office Action dated Jul. 25, 2012, 8 pages.
Foreign Communication From a Related Counterpart Application, Chinese Application No. 200880119052.3, Partial Translation of Chinese Office Action dated Jul. 25, 2012, 2 pages.
Partial English Translation of Chinese Publication 101013919, published Aug. 8, 2007, 4 pages.

* cited by examiner

BURST POWER MEASUREMENTS USING AVERAGED POWER MEASUREMENT

CROSS-REFERENCE TO RELATED APPLICATIONS

The present application is a continuation of U.S. application Ser. No. 12/276,578 filed Nov. 24, 2008 by Frank J. Effenberger, et al. and entitled "Burst Power Measurements Using Averaged Power Measurement," which claims the benefit of U.S. Provisional Patent Application No. 61/018,800 filed Jan. 3, 2008 by Frank J. Effenberger, et al. and entitled, "Burst Power Measurements Using Averaged Power Measurement," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. The ODN comprises optical fibers, couplers, splitters, distributors, filters, and other passive optical devices, which connect the OLT to the ONUs. A PON may be a long reach PON (LR-PON), where the OLT and the ONUs may communicate along longer distances in comparison with other PONs. An LR-PON may comprise an Extender Box, which may be coupled to the OLT and the ONUs. The Extender Box may amplify the optical signals forwarded between the OLT and the ONUs and along at least some of the other LR-PON components. As such, the amplified optical signals may be less affected by increased signal attenuations, which are introduced at the various LR-PON components, along longer distances between the OLT and the ONUs.

SUMMARY

In one embodiment, the disclosure includes an apparatus comprising an individual optical power level calculation (IOPLC) module and a transceiver coupled to the IOPLC module and configured to communicate with a plurality of ONUs.

In another embodiment, the disclosure includes an apparatus comprising a control and management (CM) module, an average power level measurement (APLM) module coupled to the CM module, a first transceiver coupled to the CM module and configured to communicate with an OLT, and a second transceiver coupled to the CM module and the APLM module, and configured to communicate with a plurality of ONUs.

In yet another embodiment, the disclosure includes a method comprising at least one processor configured to implement a method comprising obtaining a plurality of average power levels over a plurality of time intervals for a plurality of burst power levels corresponding to a plurality of optical signals from a plurality of ONUs, obtaining a plurality of timeslots associated with the optical signals, and determining values for the burst power levels using the average powers levels, the time intervals, and the timeslots.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for estimating a plurality of unknown burst power levels corresponding to a plurality of optical signals, which may be transmitted from a plurality of ONUs in a PON. The burst power levels may be estimated based on a plurality of known average power levels. The average power levels may be measured over a plurality of corresponding time intervals at an Extender Box coupled to the ONUs and an OLT without using timing information for the individual optical signals. Accordingly, the average power levels and the corresponding time intervals may be processed, in addition to bandwidth information, to calculate the unknown burst power levels corresponding to the ONUs. Specifically, a plurality of timeslots may be obtained based on the bandwidth information, and may be associated with the corresponding unknown burst power levels. The sum of the individual products of the unknown burst power levels and the corresponding timeslots may be equated to a product of one known average power level and one corresponding time interval to obtain one equation. As such, a plurality of equations, corresponding to each measured average power level, may be obtained and processed using a numerical procedure to obtain the unknown burst power levels. Once obtained, the burst power levels may be analyzed to assess the performances of or detect problems in the individual ONUs.

Figure 1:
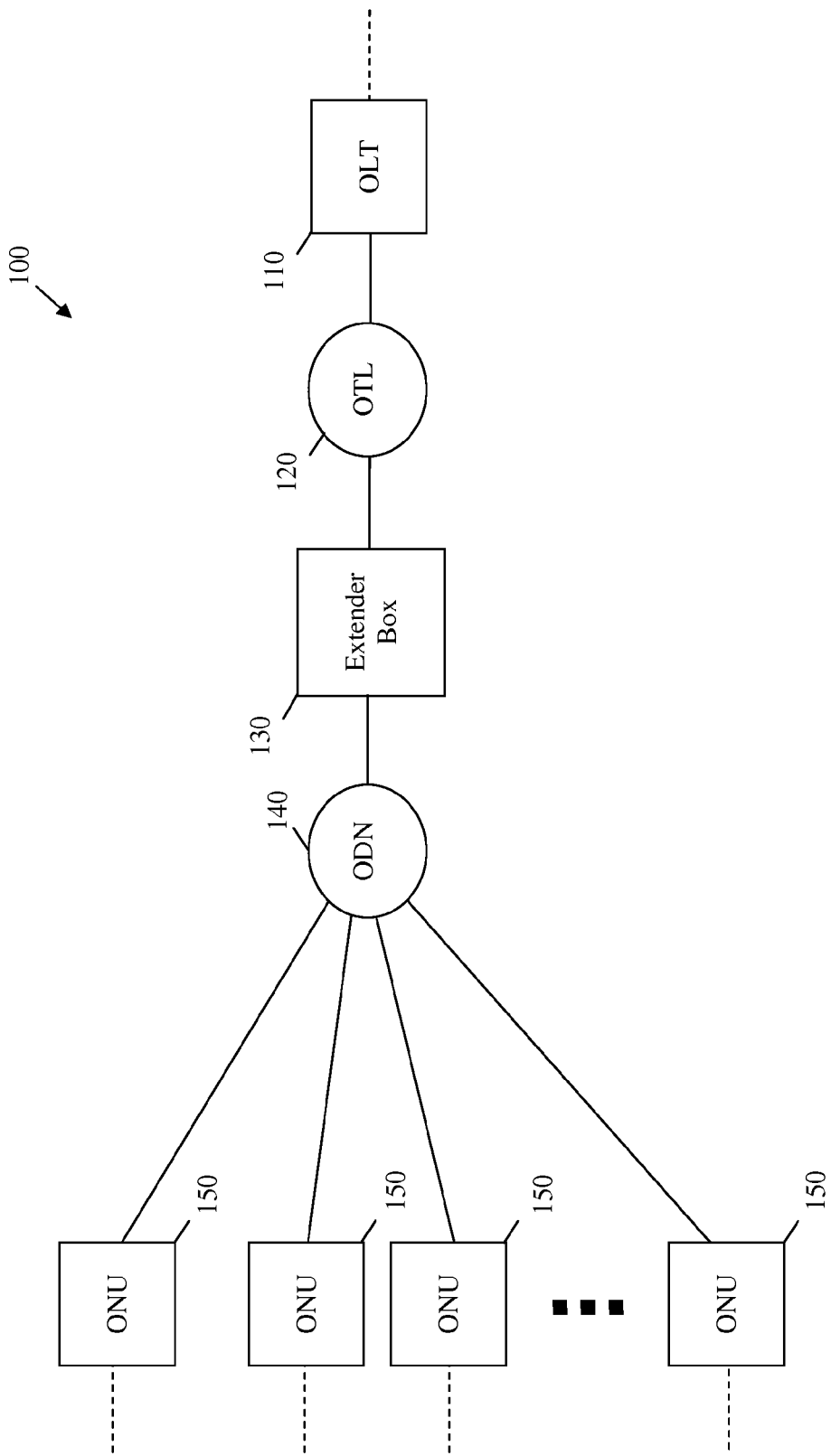
FIG. 1 is a schematic diagram of an embodiment of a PON.

FIG. 1 illustrates one embodiment of a PON 100. The PON 100 may comprise an OLT 110, an optical trunk line (OTL) 120, an Extender Box 130, an ODN 140, and a plurality of ONUs 150. The PON 100 may be a communications network that does not require any active components to distribute data between the OLT 110 and the ONUs 150. Instead, the PON 100 may use the passive optical components in the ODN 140 to distribute data, in the form of optical signals, between the OLT 110 and the ONUs 150. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON). Further, the PON 100 may be an LR-PON, where the optical signals forwarded between the OLT 110 and the ONU 150 may be amplified, for instance using the Extender Box 130, to tolerate increased signal attenuations introduced along increased distances between the OLT 110 and the ONUs 150.

The OLT 110 may be any device that is configured to communicate with the ONUs 150 and another network (not shown). Specifically, the OLT 110 may act as an intermediary between the other network and the ONUs 150. In an embodiment, the OLT 110 may communicate with the network using a server network interface (SNI) and with the ONUs 150 or other components of the PON 100 coupled to the ONUs 150 using a send/receive point or interface (S/R). The OLT 110 may forward data received from the network to the ONUs 150 and forward data received from the ONUs 150 onto the other network. For instance, the OLT 110 may forward the data in the form of optical signals to the ONUs 150 and in the form of electrical or radio signals to the network. Although the specific configuration of the OLT 110 may vary depending on the type of PON 100, in an embodiment, the OLT 110 may comprise a transmitter, a receiver, a transceiver, or combinations thereof. When the other network is using a protocol, such as Ethernet or Synchronous Optical Networking (SONET)/Synchronous Digital Hierarchy (SDH), that is different from the communications protocol used in the PON 100, the OLT 110 may comprise a converter that converts the other network's data into the PON's protocol. The converter may also convert the PON's data into the other network's protocol. The OLT 110 may be located at a central location, such as a central office, but may be located at other locations as well.

The OTL 120 may be a single optical fiber or a plurality of aggregated fibers coupled to the OLT 110 and the Extender Box 130. In an alternative embodiment, the OTL 120 may be configured similar to the ODN 140 and comprise optical fibers, couplers, splitters, distributors, filters, other passive optical devices, or combinations thereof.

The Extender Box 130 may be configured to receive, amplify, and retransmit or forward the optical signals between the OLT 110 and the ONUs 150. Specifically, the Extender Box 130 may act as a signal booster or regenerator for the optical signals, which may be transported over longer distances or through more optical components with respect to other PONs, such as in an LR-PON. For instance, the Extender Box 130 may comprise a repeater or amplifier, such as an optical-electrical-optical (OEO) converter or a semiconductor optical amplifier (SOA) inserted between the OTL 120 and the ODN 140. In an embodiment, the Extender Box 130 may exchange the optical signals with the OTL 120 using an interface to the trunk (IFT), and exchange the optical signals with the ODN 140 using an interface to the distribution (IFD). Further, the Extender Box 130 may comprise a transmitter, a receiver, a transceiver, other modules, or combinations thereof.

The ODN 140 may be a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data as optical signals between the OLT 110 and the ONUs 150. The ODN 140 may extend from the Extender Box 130 to the ONUs 150 in a branching configuration or in any alternative configuration.

The ONUs 150 may be any devices that are configured to communicate with the OLT 110 and at least one customer or user (not shown). Specifically, the ONUs 150 may act as an intermediary between the OLT 110 and the customer. For instance, the ONUs 150 may forward data received from the OLT 110 to the customer and forward data received from the customer onto the OLT 110. In an embodiment, the ONUs 150 may exchange the optical signals with the ODN 140 using a receive/send point or interface (R/S), and exchange the optical signals with the customer using a user network interface (UNI). Although four ONUs 150 are shown in FIG. 1, the PON 100 may comprise any number of ONUs 150.

Although the specific configuration of the ONUs 150 may vary depending on the type of PON 100, in an embodiment, the ONUs 150 may comprise an optical transmitter configured to send optical signals to the OLT 110. Additionally, the ONUs 150 may comprise an optical receiver configured to receive optical signals from the OLT 110 and a converter that converts the optical signal into electrical signals for the customer, such as signals in the asynchronous transfer mode (ATM) or Ethernet protocol. The ONUs 150 may also comprise a second transmitter and/or receiver that may send and/or receive the electrical signals to a customer device. In some embodiments, the ONUs 150 and optical network terminals (ONTs) are similar, and thus the terms are used interchangeably herein. The ONUs 150 may be located at distributed locations, such as the customer premises, but may be located at other locations as well.

The optical signals transmitted from the ONUs 150 may be burst optical signals, e.g., optical signals that are transmitted intermittently or separated by time delays or pauses, which may have signal power levels referred to as burst power levels. In normal operating conditions, the burst power levels of the transmitted optical signals may be equal to at least one power level associated with the transmitters' standard performances at the ONUs 150. However, when the operating condition at an ONU 150 deteriorates due to a decrease in the transmitters' performance, the burst power level may decrease or may fluctuate over time. Hence, measuring the burst power level corresponding to the optical signal may be advantageous to assess the performance of the ONU 150 or to detect a problem in the ONU 150 or the transmitter.

However, measuring the burst power levels of the optical signals at the OLT 110 may be difficult in the PON 100 in the presence of the Extender Box 130. Specifically, the transmitted optical signals from the ONUs 150 may be amplified at the Extender Box 130 at variable amplification levels, for instance due to design or physical limitations, before being forwarded to the OLT 110. Thus, it may be difficult to correlate the power levels of the amplified optical signals received at the OLT 110 with the burst power levels of the optical signals transmitted from the ONUs 150. Hence, measuring the power levels of the amplified optical signals at the OLT 110 may not be an accurate evaluation of the burst power levels of the optical signals from the ONUs 150. Moreover, the burst power levels of the optical signals may not be directly measured at the Extender Box 130. Specifically, the Extender Box 130 may not be configured to implement a PON protocol, for instance to reduce the impact of adding the Extender Box 130 on system design. Hence, the Extender Box 130 may be configured as a passive device, which may not associate the individual burst power levels with the corresponding optical signals.

To overcome the difficulty in measuring the burst power levels of the optical signals at the OLT 110 or associating the optical signals with corresponding ONUs 150 at the Extender Box 130, a plurality of average power levels corresponding to the optical signals may be measured at the Extender Box 130. The average power levels may be measured over a plurality of corresponding time intervals or durations, which may each comprise the total time for receiving at least some of the optical signals at the Extender Box 130. In an embodiment, the measured average power levels and the corresponding time intervals may then be forwarded from the Extender Box 130 to the OLT 110, where they may be processed, in addition to timing information, to evaluate or estimate the corresponding burst power levels for the transmitted optical signals from the individual ONUs 150. Specifically, the timing information may be needed to associate the burst power levels with the corresponding ONUs 150. For instance, the timing information may comprise a plurality of timeslots or durations corresponding to the transmitted optical signals. In an embodiment, the timing information may be obtained from bandwidth information, which may be stored at the OLT 110. The bandwidth information may be historic bandwidth information, which may be acquired by recording the time bandwidth of previously transmitted optical signals from the ONUs 150. Hence, the timing information or timeslots may be extracted from the recorded time bandwidth. Alternatively, the bandwidth information may be statistical bandwidth information, which may be obtained based on anticipated traffic from the ONUs 150, historic traffic in the PON 100, or both.

Figure 2:
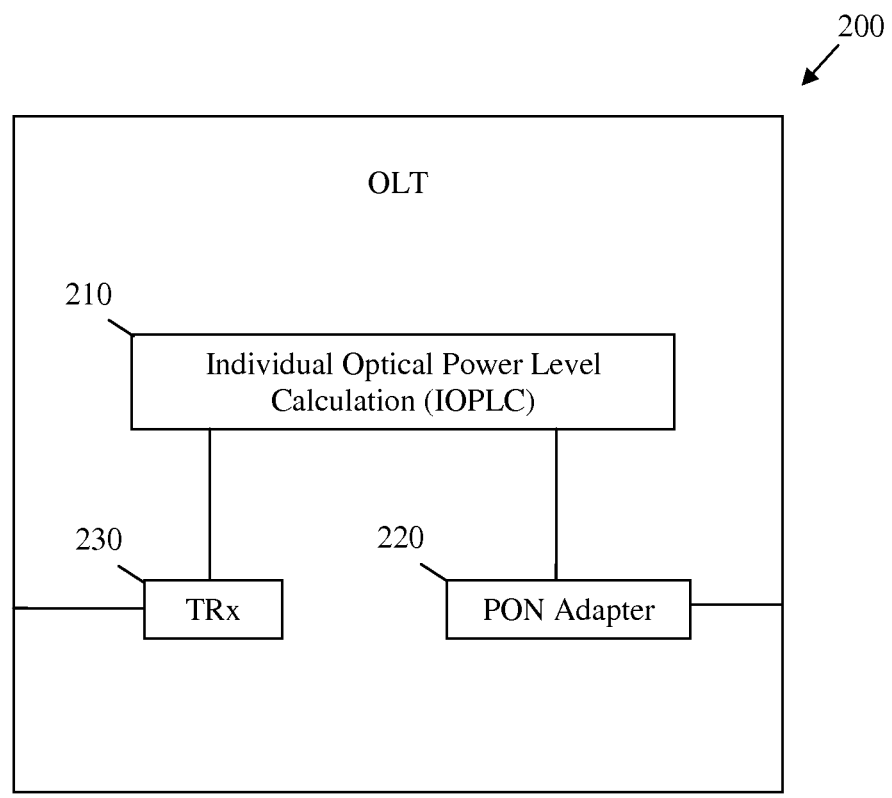
FIG. 2 is a schematic diagram of an embodiment of an OLT.

FIG. 2 illustrates one embodiment of an OLT 200, which may be used to estimate the burst power levels at a PON, such as the PON 100. The OLT 200 may comprise an IOPLC module 210, which may be coupled to a PON adapter 220 and a transceiver 230. The IOPLC module 210 may be configured to evaluate or calculate the burst power levels using the average power levels and the corresponding time intervals, which may be obtained from the Extender Box 130, and the timing information, which may be stored in the OLT 200. In an embodiment, the IOPLC module 210 may be a software, hardware, firmware, or combinations thereof, which may be programmed to receive as inputs the average power levels, the time intervals, and the timeslots corresponding to the burst power levels. Hence, the IOPLC 210 may process the inputs based on an algorithm or program to provide the burst power levels as outputs.

The PON adapter 220 may be coupled to a server or a network, for instance via an SNI, and may be used to exchange data between the OLT 200 and the server or network. For instance, the PON adapter 220 may forward at least some of the inputs or outputs of the IOPLC 210, including the burst power levels, to a network operator or manager in charge of detecting problems in the PON's ONUs. Additionally, the PON adapter 220 may exchange other data, including data received from the ONUs, with the server or network. Accordingly, the PON adapter 220 may convert the exchanged data based on the protocols and the transport layer architectures of the OLT 200 and the network. In some embodiments, the PON adapter 220 may comprise a transmitter, receiver, transceiver, or combinations thereof.

The transceiver 230 may be coupled, for instance via an S/R, to an Extender Box, which may be in turn coupled to the ONUs. The transceiver 230 may be an integrated device comprising an optical transmitter and receiver or alternatively may comprise an optical transmitter coupled to an optical receiver. The transceiver 230 may be used to exchange data between the OLT 200 and the Extender Box, as well as the ONUs. For instance, the transceiver 230 may forward the average power levels and the time intervals from the Extender Box to the IOPLC 210. Additionally, the transceiver 230 may forward data between the OLT 200 and the ONUs via the Extender Box.

Figure 3:
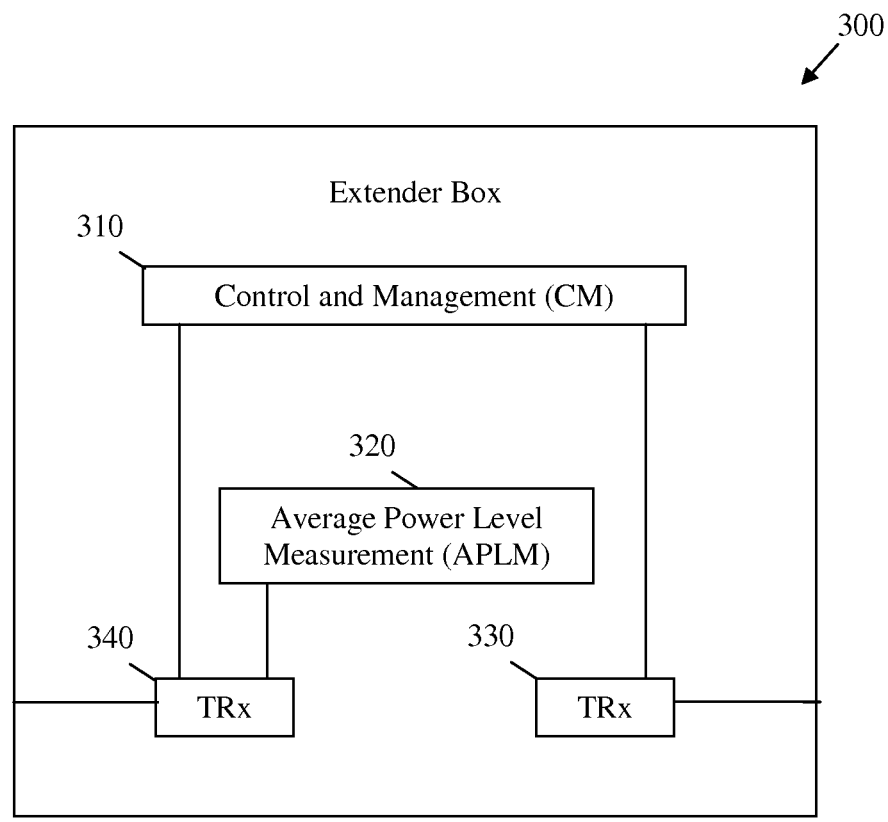
FIG. 3 is a schematic diagram of an embodiment of an Extender Box.

FIG. 3 illustrates one embodiment of an Extender Box 300, which may be used to measure the average power levels of the optical signals transmitted from a plurality of ONUs, such as the ONUs 150 described above. The Extender Box 300 may comprise a CM module 310, an average power level measurement (APLM) module 320, a first transceiver 330, which may be coupled to the CM module 310, and a second transceiver 340, which may be coupled to the CM module 310 and the APLM module 320. The CM module 310 may be configured to set the time intervals over which the average power levels may be measured. For instance, the CM module 310 may set a plurality of about equal or different time intervals for measuring a plurality of average signals. In some embodiments, the CM module 310 may set a discrete number equal to the quantity of the average power levels to be measured, a discrete number equal to the quantity of burst power levels to be detected for each average power level, or both. The CM module 310 may forward the time intervals, and in some embodiments the discrete numbers, to the APLM module 320 via the second transceiver 340. For instance, the CM module 310 may comprise a software, hardware, firmware, or combinations thereof, which may be programmed to provide the time intervals as an input to the APLM module 320. In other embodiments, the CM module 310 may be configured to receive such measurement settings via the first transceiver 330, for instance from an OLT coupled to the Extender Box 300, and to forward it to the APLM module 320.

The APLM module 320 may be configured to measure the average power levels over the time intervals set by the CM module 310. To measure each of the average power levels, the APLM module 320 may receive a plurality of optical signals from the individual ONUs, via the second transceiver 340, and detect the corresponding individual burst power levels. For instance, the APLM module 320 may detect a quantity of burst power levels equal to the discrete number set by the CM module 310. Hence, the APLM module 320 may sum the burst power levels, and divide the sum by the discrete number to obtain a corresponding average power level. Alternatively, the APLM module 320 may detect and average a plurality of burst power levels in a continuous manner over the time interval, for instance using a low pass filter. The APLM module 320 may comprise at least a software, hardware, firmware, or combinations thereof, which may be programmed to receive, as inputs, the burst power levels and provide, as outputs, the average power levels, which may then be forwarded to the CM module 310, via the second transceiver 340. In turn, the CM module 310 may forward the average power levels and the corresponding time intervals to the OLT, via the first transceiver 330.

The first transceiver 330 and the second transceiver 340 may be integrated devices comprising a plurality of optical transmitters and receivers or alternatively may comprise a plurality of optical transmitters coupled to a plurality of optical receivers. The first transceiver 330 may be coupled to an OLT, for instance via an IFT, and may be used to exchange data between the OLT and the Extender Box 300. For instance, the first transceiver 330 may forward at least some of the inputs or outputs of the CM module 310, as described above. Additionally, the first transceiver 330 may exchange other data, including data received from the ONUs, with the OLT. The second transceiver 340 may be coupled, for instance via an IFD, to an ODN, which may be in turn coupled to the ONUs. The second transceiver 340 may be used to detect the burst power levels of the optical signals. For instance, the second transceiver 340 may comprise an optical detector, such as a detector array, a photodiode, or other types of detectors, which may detect the strength or power of the optical signal, or convert the optical signal into an electrical signal, which may be measured. The second transceiver 340 may also exchange data between the ONUs and the Extender Box 300 or the OLT, in addition to the measurements described above. For instance, the second transceiver 340 may forward the data from the ONUs and the average power levels from the APLM module 320, via the CM module 310, to the first transceiver 330, which may in turn forward it to the OLT.

In other embodiments, instead of measuring the average power levels at the Extender Box 300 and forwarding the average power levels to the OLT 200 to estimate the burst power levels, the OLT may forward to the Extender Box the timing information, bandwidth information, or timeslots needed to estimate the burst power levels. Accordingly, the Extender Box may comprise an IOPLC module in addition to the APLM module 320. The Extender Box may receive the needed information from the OLT, measure the average power levels, and estimate the burst power levels using the average power levels, the corresponding time intervals, and the received timeslots. In alternative embodiments, the Extender Box may send the sum of the detected power levels to the OLT. Accordingly, the OLT may comprise an APLM module 320 in addition to the IOPLC module, and may evaluate the average power levels and estimate the burst power levels.

Figure 4:
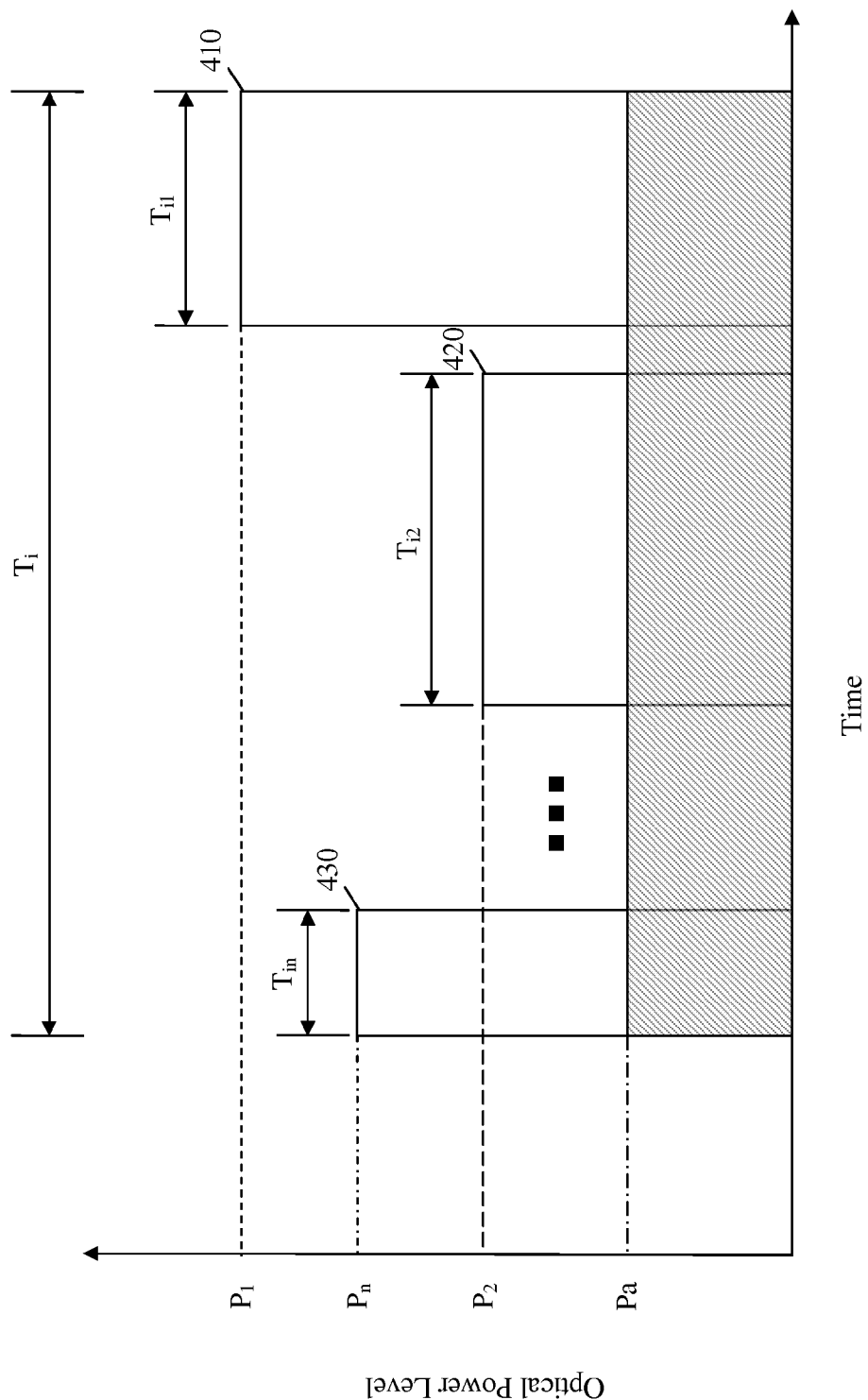
FIG. 4 is a chart showing the power levels and time lengths of a plurality of transmissions.

FIG. 4 illustrates one embodiment of a plurality of burst optical signals, including a first burst optical signal 410, a second burst optical signal 420, and an nth burst optical signal 430, which may be detected over a time interval equal to about $T_i$. The nth burst optical signal 430 may be the last detected burst optical signal in a sequence of n burst optical signals, where n may be equal to an integer or a discrete number set by a CM module. The time interval $T_i$ may be equal to the time interval, for instance set by a CM module, over which an average power of the ONUs' optical signals may be measured. The burst power levels of the burst optical signals may be detected at about equal or different values by the optical detector. For instance, the first burst optical signal 410, the second burst optical signal 420, and the nth burst optical signal 430 may have a first burst power level equal to about $P_1$, a second burst power level equal to about $P_2$, and an nth burst power level equal to about $P_n$, respectively. The burst power levels of the detected burst optical signals may be summed and divided by the quantity of the detected burst optical signals to measure or obtain the average power level. For instance, a total of n values, including $P_1$, $P_2$, and $P_n$, may be summed up and divided by n to obtain a value of $P_a$ for the average power level.

Further, each detected burst optical signal may be associated with a timeslot, for instance using bandwidth information, which may be a portion of the time interval $T_i$. For instance, the first burst optical signal 410, the second burst optical signal 420, and the nth burst optical signal 430 may be associated with a first timeslot $T_{i1}$, a second timeslot $T_{i2}$, and an nth timeslot $T_{in}$, respectively. The timeslots $T_{i1}$, $T_{i2}$, $T_{in}$, as well as the remaining timeslots corresponding to the remaining detected burst optical signals over the time interval $T_i$, may or may not be about equal to one another. The time interval $T_i$ may include other time portions, in addition to the timeslots corresponding to the detected burst optical signals, such as time gaps that may exist between the timeslots. The time gaps may correspond to time durations where no burst power levels may be detected or no burst optical signals may be transmitted.

The burst power levels corresponding to the ONUs' optical signals may be estimated, for instance at the IOPLC, using the average power levels measurements and based on a plurality of mathematical equations. The mathematical equations may define the relationship between the burst power levels, which may be unknown variables, with the corresponding timeslots, the average power levels, and the corresponding time intervals, which may be known values. If there are a sufficient number of equations to resolve the unknown variables, the mathematical equations may be solved to obtain values for the burst power levels. For example, the mathematical equations may comprise a system of n mathematical equations that relate n unknown burst power levels and n known average power levels, where n is an integer. Specifically, a total or sum of the products of each burst power level and its corresponding timeslot may be equated to a product of one average power level and its corresponding time interval. The system of n mathematical may be represented in a generic form, such as:

$$(P_1 \times T_{i1}) + (P_2 \times T_{i2}) + \ldots + (P_{(n-1)} \times T_{i(n-1)}) + (P_n \times T_{in}) = Pa_i \times T_i.$$

For instance, the above equation may be the ith equation in the system of n equations, where $Pa_i$ is the ith average power level, $T_i$ is the ith corresponding time interval, $P_1$, $P_2$, ..., $P_{(n-1)}$, and $P_n$ are n burst power levels, $T_{i1}$, $T_{i2}$, ..., $T_{i(n-1)}$, and $T_{in}$ are n corresponding timeslots, n is equal to the number of burst power levels, and i is an integer less than or equal to the number of average power levels. The number of average power levels may be equal to or greater than n, e.g., the number of the unknown burst power levels to be estimated. Increasing the number of measured average power levels may reduce the amount of errors or uncertainties in the calculated burst power levels, for instance due to measurement errors or noise from the optical detector. Further, each average power level may be measured a plurality of times or repeatedly at a predetermined rate over the time interval, which may be set by the CM module. The measured values may then be averaged to obtain an average power level value with less error or uncertainty, and hence more accurate burst power level values.

The n equations may be solved simultaneously using standard solution methods or any solution methods that may be used to obtain the values of the burst power levels from the average power levels. The standard solution methods may include statistical solution methods, linear and non-linear regression techniques, least error solutions, or any other solution methods that may be used to solve the burst power levels. For instance, using a least error solution, the estimated values of the burst power levels may correspond to an acceptable fitting error for the measured average power levels. In other words, using the least error solution, the obtained values of the burst power levels may correspond to measurement values that are substantially equal to the acquired values of the average power levels.

In another embodiment, one burst power level for an optical signal from a single ONU may be estimated without estimating the remaining burst power levels. The burst power level may be estimated using two equations that represent the relation between the unknown burst power levels for all the optical signals from the ONUs, with two measured average power levels. Specifically, the burst power level may be estimated based on a first average power level measured over a first time interval and a second average power level measured over a second time interval, which may be consecutive to the first time interval. Further, the burst power level may be associated with a first timeslot during the first time interval and a second timeslot during the second time interval, which may not be equal to the first timeslot. For instance, the second timeslot may be longer than the first timeslot. However, the remaining burst power levels may be associated with corresponding timeslots which may be about equal during the first time interval and the second time interval. The system of two equations may be represented such as:

$$(P_1 \times T_{11}) + (P_2 \times T_{12}) + \ldots + (P_{(n-1)} \times T_{1(n-1)}) + (P_n \times T_{1n})$$
$$= Pa_1 \times T_1$$

$$(P_1 \times T_{21}) + (P_2 \times T_{22}) + \ldots + (P_{(n-1)} \times T_{2(n-1)}) + (P_n \times \{T_{2n} + \delta\}) = Pa_2 \times T_2,$$

wherein $Pa_1$ is the first average power level, $T_1$ is the first time interval, $Pa_2$ is the second average power level, $T_2$ is the second time interval, $P_n$ is the burst power level, $T_{1n}$ is the first timeslot at the first time interval, $\{T_{2n}, \delta\}$ is the second timeslot at the second time interval, and $\delta$ is equal to about the time difference between the second timeslot and the first timeslot. Additionally, $P_1, P_2, \ldots$, and $P_{n-1}$ are the remaining burst power levels, $T_{11}, T_{12}, \ldots$, and $T_{1(n-1)}$ are the corresponding timeslots at the first time interval, $T_{21}, T_{22}, \ldots$, and $T_{2(n-1)}$ are the corresponding timeslots at the second time interval, and n is equal to the number of burst power levels.

Figure 5:
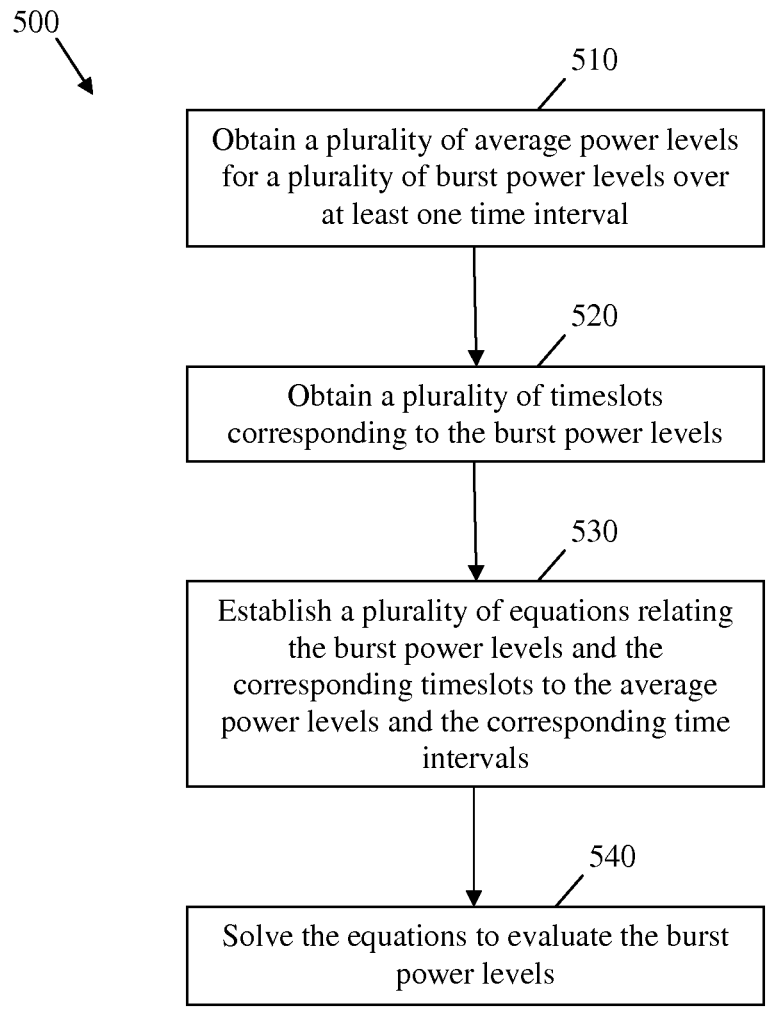
FIG. 5 is a flowchart of an embodiment of a burst power level estimation method.

FIG. 5 illustrates an embodiment of a burst power level estimation method 500, which may be used in a PON system comprising an Extender Box, such as an LR-PON. The burst power level estimation method 500 may be implemented at the OLT. Alternatively, the burst power level estimation method 500 may be implemented at another PON component in communication with the OLT, such as the Extender Box. At block 510, the burst power level estimation method 500 may obtain a plurality of average power levels, which may be measured at the Extender Box, and at least one time interval. For instance, the average power levels and the time interval may be forwarded from the Extender Box to the OLT via an OTL. Alternatively, the average power levels and the time interval may be obtained and stored within the Extender Box, for instance from the APLM and CM modules.

At block 520, the burst power level estimation method 500 may obtain a plurality of timeslots corresponding to the burst power levels, for instance from historic or statistical bandwidth information. The bandwidth information may be stored at the OLT or may be forwarded from a network server or manager to the OLT, which may also receive the average power levels and the time interval. Alternatively, the bandwidth information or timeslots may be forwarded from the OLT to the Extender Box, where the average power levels and the time interval may be obtained and stored.

At block 530, the relation between the burst power levels, the timeslots, the average power levels, and the time intervals may be established, for instance using a system of mathematical equations, as described above. The system of mathematical equations may comprise a number of equations equal to the number of measured average power levels, and equal to or greater than the number of unknown burst power levels. Additionally or alternatively, another system of equations, comprising at least two equations, may be established to estimate the value of any burst power level associated with a selected ONU, as described above.

At block 540, the relation or system of equations that relates the unknown burst power levels to the measured average power levels and the other known values may be processed or solved to calculate or resolve at least one of the burst power levels, as described above. The system of equations may be established and solved at the OLT, for instance using an IOPLC module. Alternatively, the an IOPLC module may be present at or coupled to the Extender Box, where the burst power levels may be estimated, and then forwarded to the OLT. Additionally, the burst power levels may optionally be forwarded to other PON components, such as the ONUs or a PON component in charge of monitoring or detecting problems in the ONUs.

Figure 6:
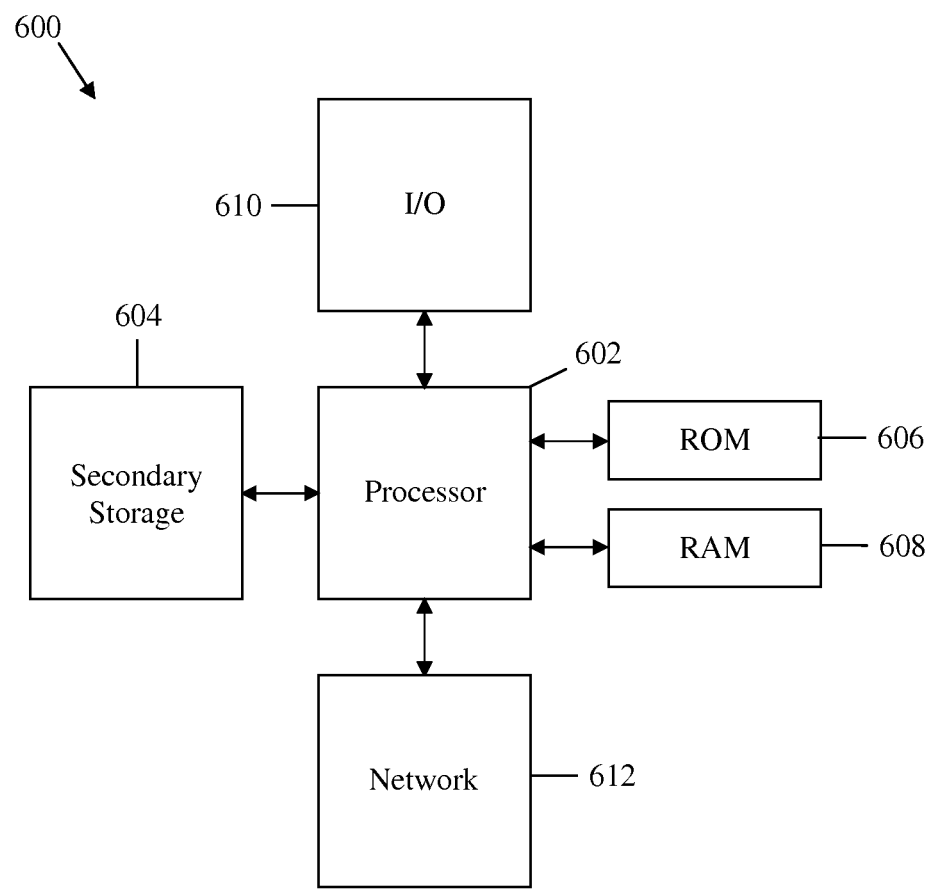
FIG. 6 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers, as defined in the above, is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A reach extender comprising:
an upstream signal regenerator; and
a measurement circuit configured to generate a series of measurements of time averaged received upstream optical signal power from one or more optical network units (ONUs), wherein the measurement circuit has a temporal response similar to a low pass filter,
wherein the reach extender is configured to report the series of measurements to an optical line terminal (OLT), and
wherein the reach extender is located between the one or more ONUs and the OLT.

2. The reach extender of claim 1, wherein the measurement circuit is configured to measure optical signal power without using burst-level timing information from the one or more ONUs.

3. The reach extender of claim 1, wherein the upstream signal regenerator is configured to regenerate signals from the one or more ONUs in the upstream direction to the OLT.

4. The reach extender of claim 1, wherein the upstream signal regenerator is an optical-electrical-optical (OEO) amplifier.

5. The reach extender of claim 1, wherein the measurement circuit has a temporal response similar to a one pole low pass filter.

6. The reach extender of claim 1, wherein an optical trunk line (OTL) is located between the reach extender and the OLT, and wherein an optical distribution network (ODN) is located between the reach extender and the one or more ONUs.

7. The reach extender of claim 1, wherein the reach extender is not a part of the one or more ONUs, the OLT, an optical trunk line (OTL), and an optical distribution network (ODN).

8. A method comprising:
regenerating signals from one or more optical network units (ONUs) in the upstream direction to an optical line terminal (OLT);
generating a series of measurements of time averaged received upstream optical signal power from the one or more ONUs, wherein the measurements are generated similar to a low pass filter and
reporting the series of measurements to the OLT.

9. The method of claim 8, wherein optical signal power is measured without using burst-level timing information from the one or more ONUs.

10. The method of claim 8, wherein the regenerating is performed by an upstream signal regenerator.

11. The method of claim 10, wherein the upstream signal regenerator is an optical-electrical-optical (OEO) amplifier.

12. The method of claim 8, wherein the measurements are generated similar to a one pole low pass filter.

13. The method of claim 8, wherein the method is performed in a reach extender, and wherein an optical trunk line (OTL) is located between the reach extender and the OLT, and wherein an optical distribution network (ODN) is located between the reach extender and the one or more ONUs.

14. The method of claim 10, wherein the upstream signal regenerator is a part of a reach extender, wherein the generating and performing are performed by the reach extender, and wherein the reach extender is not a part of the one or more ONUs, the OLT, an optical trunk line (OTL), and an optical distribution network (ODN).

15. A reach extender comprising:
an optical-electrical-optical (OEO) amplifier configured to perform OEO regeneration in an upstream direction; and
a measurement circuit configured to generate a series of measurements of time averaged received upstream optical power from one or more optical network units (ONUs),
wherein the measurement circuit has a temporal response similar to a low pass filter,
wherein the reach extender is configured to report the series of measurements, and
wherein the reach extender is located between the one or more ONUs and an optical line terminal (OLT).

16. The reach extender of claim 15, wherein the measurement circuit is configured to measure optical signal power without using burst-level timing information from the one or more ONUs.

17. The reach extender of claim 15, wherein the upstream signal regenerator is configured to regenerate signals from the one or more ONUs in the upstream direction to the OLT.

18. The reach extender of claim 15, wherein the measurement circuit has a temporal response similar to a one pole low pass filter.

19. The reach extender of claim 15, wherein an optical trunk line (OTL) is located between the reach extender and the OLT, and wherein an optical distribution network (ODN) is located between the reach extender and the one or more ONUs.

20. The reach extender of claim 15, wherein the reach extender is not a part of the one or more ONUs, the OLT, an optical trunk line (OTL), and an optical distribution network (ODN).

* * * * *